United States Patent
Bazile et al.

(10) Patent No.: US 10,082,799 B2
(45) Date of Patent: Sep. 25, 2018

(54) METHOD AND DEVICE FOR ASSISTING THE INTIATION OF A FLARE MANEUVER OF AN AIRCRAFT DURING A LANDING OF THE AIRCRAFT

(71) Applicants: AIRBUS OPERATIONS (S.A.S.), Toulouse (FR); AIRBUS (S.A.S.), Blagnac (FR)

(72) Inventors: Jerôme Bazile, Leguevin Toulouse (FR); Patrice Rouquette, Pompertuzat (FR); Matthias Eberle, Ulm (DE); Philippe Perrin, Toulouse (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 0 days.

(21) Appl. No.: 15/625,285

(22) Filed: Jun. 16, 2017

(65) Prior Publication Data
US 2017/0364092 A1    Dec. 21, 2017

(30) Foreign Application Priority Data

Jun. 21, 2016 (FR) ..................... 16 55783

(51) Int. Cl.
*G05D 1/06* (2006.01)
*B64C 19/00* (2006.01)
(Continued)

(52) U.S. Cl.
CPC .......... *G05D 1/0676* (2013.01); *B64C 19/00* (2013.01); *B64D 45/04* (2013.01); *G05D 1/0825* (2013.01);
(Continued)

(58) Field of Classification Search
CPC .... G05D 1/0676; G05D 1/0825; G05D 1/101; G05D 1/042; B64C 19/00; B64D 45/04; G08G 5/0021; G08G 5/025
(Continued)

(56) References Cited

U.S. PATENT DOCUMENTS 4,057,782 A  11/1977 Muller
4,302,827 A * 11/1981 Rosenblum ............. G01S 15/88
                                                            340/964
(Continued)

OTHER PUBLICATIONS

French Search Report for Application No. 1655783 dated Feb. 20, 2017.

*Primary Examiner* — Marthe Y Marc-Coleman
(74) *Attorney, Agent, or Firm* — Jenkins, Wilson, Taylor & Hunt, P.A.

(57) ABSTRACT

A method and device for assisting initiation of a flare maneuver of an aircraft during a landing. The device includes an acquisition unit for acquiring current values of flight parameters of the aircraft, including the current height of the aircraft with respect to the ground, a computation unit for computing a first reference height and a second reference height, corresponding to a height starting from which the aircraft attains a current start of flare height while maintaining its current descent conditions over a predetermined first duration and over a predetermined second duration respectively, and an acoustic emission unit for emitting at least two sound signals in the cockpit of the aircraft, namely a first sound signal when the current height of the aircraft attains the first reference height during the descent and a second sound signal when the current height of the aircraft attains the second reference height during descent.

14 Claims, 3 Drawing Sheets

(51) Int. Cl.
  *B64D 45/04* (2006.01)
  *G05D 1/08* (2006.01)
  *G05D 1/10* (2006.01)
  *G05D 1/04* (2006.01)
  *G08G 5/02* (2006.01)
  *G08G 5/00* (2006.01)

(52) U.S. Cl.
  CPC ........... *G05D 1/101* (2013.01); *G08G 5/0021* (2013.01); *G08G 5/025* (2013.01); *G05D 1/042* (2013.01)

(58) Field of Classification Search
  USPC ..... 701/16; 340/945, 947, 970; 244/187, 81, 244/183
  See application file for complete search history.

(56) References Cited

U.S. PATENT DOCUMENTS

| | | | |
|---|---|---|---|
| 5,020,747 A * | 6/1991 | Orgun | G05D 1/0676 244/187 |
| 6,567,014 B1 | 5/2003 | Hansen et al. | |
| 2013/0103233 A1* | 4/2013 | Bourret | B64D 45/04 701/18 |

* cited by examiner

METHOD AND DEVICE FOR ASSISTING THE INTIATION OF A FLARE MANEUVER OF AN AIRCRAFT DURING A LANDING OF THE AIRCRAFT

CROSS-REFERENCE TO RELATED APPLICATION

This application claims the benefit of and priority to French patent application number FR 16 55783 filed on Jun. 21, 2016, the entire disclosure of which is incorporated by reference herein.

TECHNICAL FIELD

The present disclosure relates to a method and a device for assisting the initiation of a flare maneuver of an aircraft, in particular of a transport aircraft, during a landing of the aircraft.

PRIOR ART

When landing an aircraft, in order to manually carry out a flare ("flare" being the English word) maneuver consisting of rounding out the aircraft, the pilot of the aircraft must operate a control stick. This operation must be carried out in such a way that the impact (or touchdown) of the aircraft on the ground takes place in a smooth and comfortable manner for the passengers, that is to say that the vertical speed of the aircraft on touchdown on the runway is less than a limit value. This limit value is notably a function of structural criteria of the aircraft and of passenger comfort criteria.

In order that the flare maneuver can be carried out in an appropriate manner, it is notably necessary to initiate it at the correct time. In order to do this, the pilot must know exactly when he must operate the control stick in order to initiate the flare maneuver.

The operation of the control stick is, generally, based on the pilot's visual feedback of the environment of the aircraft, on flight parameters indicated in the cockpit, and on acoustic parameters such as engine noise or wind noise. The pilot's attention must thus move from the piloting instruments to the runway and vice-versa and this occurs a large number of times over a short period of time. The landing is therefore a flight phase necessitating high attention and concentration by the pilot who is receiving numerous items of information.

It would therefore be advantageous for information relative to an initiation of a flare maneuver to be provided to the pilot in such a way as to reduce his workload.

SUMMARY

The present disclosure relates to a method for assisting the initiation of a flare maneuver of an aircraft, during a landing of the aircraft, the purpose of which is to inform the pilot efficiently and precisely when he must start the flare maneuver.

For this purpose, according to the disclosure herein, the method comprises at least the following series of steps, implemented during a descent of the aircraft during the landing:
 an acquisition step, implemented by at least one acquisition unit and consisting of or comprising acquiring in real time current values of flight parameters of the aircraft, including the current height of the aircraft with respect to the ground;
 a first computation step, implemented by a first computation unit and consisting of or comprising computing, in real time, a current start of flare height, on the basis of acquired current values;
 a second computation step, implemented by a second computation unit and consisting of or comprising computing, in real time, at least a first height and a second height called reference heights, the first reference height corresponding to a height starting from which the aircraft attains the current start of flare height while maintaining its current descent conditions over a first predetermined duration, the second reference height being less than the first reference height and corresponding to a height starting from which the aircraft attains the current start of flare height while maintaining its current descent conditions over a second predetermined duration;
 a third computation step, implemented by a third computation unit and consisting of or comprising determining, in real time, the time at which the current height of the aircraft attains the first reference height during the descent and the time at which the current height of the aircraft attains the second reference height during the descent; and
 an acoustic emission step, implemented by an acoustic emission unit and consisting of or comprising emitting at least two sound signals in the cockpit of the aircraft, namely a first sound signal when the current height of the aircraft attains the first reference height during the descent and a second sound signal when the current height of the aircraft attains the second reference height during the descent.

Thus, thanks to the disclosure herein, the pilot is warned by appropriate sound signals, as described below, when the aircraft arrives during the descent in the immediate proximity of the height at which the flare maneuver must start.

Moreover, the pilot is acoustically warned during the descent phase. Thus, he does not have to look at or monitor displays in order to know the exact time of initiation and his visual capabilities are not called upon in order to know this time of initiation.

This method thus makes it possible to inform the pilot, efficiently and accurately, when he must start the flare maneuver.

In a preferred embodiment, the first computation step consists of or comprises computing the current start of flare height $Z_0(t)$ as a function of time t, from the following expression:

$$Z_0(t) = \tau_{ref}(V_{Z_0}(t) - V_{Z_i})$$

where:
 $V_{Z_0}(t)$ is the current vertical speed of the aircraft on the descent trajectory;
 $V_{Z_i}$ is a predetermined value of vertical speed on impact (or on touchdown on the ground); and
 $\tau_{ref}$ is a reference constant.

Advantageously, each of the sound signals comprises at least one beep, and preferably (but not exclusively) two beeps.

In a first embodiment, the acoustic emission step consists of or comprises emitting an anticipation message to help the pilot of the aircraft to anticipate the flare, the first sound signal then being a warning signal and the second sound signal being an initiation of the flare signal. In this case, advantageously:
 the first duration is between 2 and 2.5 seconds; and
 the second duration is between 1 and 1.5 seconds.

Moreover, in a second embodiment, the acoustic emission step consists of or comprises emitting an initiation message to help the pilot of the aircraft to initiate the flare, the first sound signal then being a signal of initiation of the flare and the second sound signal being a reminder signal. In this case, advantageously:
- the first duration is between 1 and 1.5 seconds; and
- the second duration is between 0.1 and 0.2 seconds.

The present disclosure also relates to a device for assisting the initiation of a flare maneuver of an aircraft, during a landing of the aircraft.

According to the disclosure herein, the device is noteworthy in that it comprises:
- at least one acquisition unit configured for acquiring, in real time, current values of flight parameters of the aircraft, including the current height of the aircraft with respect to the ground;
- a first computation unit configured for computing, in real time, a current start of flare height, on the basis of acquired current values;
- a second computation unit configured for computing, in real time, at least a first height and a second height called reference heights, the first reference height corresponding to a height starting from which the aircraft attains the current start of flare height while maintaining its current descent conditions over a predetermined first duration, the second reference height being less than the first reference height and corresponding to a height starting from which the aircraft attains the current start of flare height while maintaining its current descent conditions over a predetermined second duration;
- a third computation unit configured for determining, in real time, the time at which the current height of the aircraft attains the first reference height during the descent and the time at which the current height of the aircraft attains the second reference height during the descent; and
- at least one acoustic emission unit configured for emitting at least two sound signals in the cockpit of the aircraft, namely a first sound signal when the current height of the aircraft attains the first reference height during the descent and a second sound signal when the current height of the aircraft attains the second reference height during the descent.

Advantageously, the first computation unit is configured for computing the current start of flare height $Z_0(t)$ as a function of time t, from the following expression:

$$Z_0(t) = \tau_{ref}(V_{Z_0}(t) - V_{Z_i}).$$

The present also relates to an aircraft, in particular a transport aircraft, which is provided with such a device for assisting the initiation of a flare maneuver.

BRIEF DESCRIPTION OF THE DRAWINGS

The appended figures will give a good understanding of how the disclosure herein can be embodied. Similar elements are denoted by identical references in these figures.

DETAILED DESCRIPTION

Figure 1:
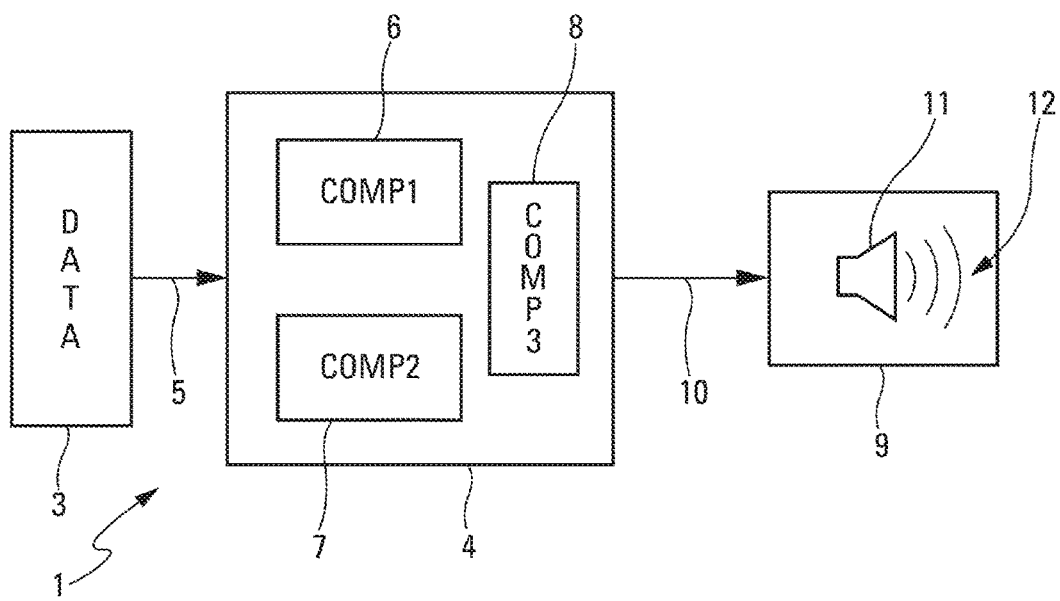
FIG. 1 is the block diagram of a device for assisting the initiation of a flare maneuver of an aircraft during a landing, which illustrates one embodiment of the disclosure herein.

The device 1, shown diagrammatically in FIG. 1 and making it possible to illustrate the disclosure herein, is intended to assist a pilot of an aircraft AC (FIGS. 2 and 3), in particular of a transport aircraft, to initiate a flare maneuver manually during the descent of the aircraft AC for the purpose of a landing on a runway 2 of an airport.

The aircraft comprises a control stick (not shown) configured for being able to be operated by a pilot in order to control the aircraft at least about the pitch axis, notably to implement the flare maneuver. The initiation of the flare maneuver is carried out by the pilot who pulls back the control stick in order to round out the aircraft so that it carries out the flare. Usual control means other than the control stick for landing in manual mode could of course be used without departing from the scope of the disclosure herein.

According to the disclosure herein, the device 1 which is installed in the aircraft AC, comprises, as shown in FIG. 1:
- at least one acquisition unit 3 ("DATA" standing for "Data Acquisition Unit" in English) configured for acquiring data in real time, namely current values of flight parameters of the aircraft AC, including the current height $Z_{AC}$ of the aircraft AC with respect to the ground S (FIGS. 2 and 3);
- a central processing unit 4 which is connected by the intermediary of a link 5 to the acquisition unit 3 and which comprises:
  - a computation unit 6 ("COMP1" for "Computation Unit" in English) configured for computing, in real time, a current start of flare height $Z_0$ (FIGS. 2 and 3), on the basis of acquired current values;
  - a computation unit 7 ("COMP2") configured for computing, in real time, at least a first height and a second height called reference heights. The first reference height ($Z_{1A}$ (FIG. 2) or $Z_{2A}$ (FIG. 3)) corresponds to a height starting from which the aircraft AC attains the current start of flare height $Z_0$ while maintaining its current descent conditions for a predetermined first duration. The second reference height ($Z_{1B}$ (FIG. 2) or $Z_{2B}$ (FIG. 3)) is less than first reference height $Z_{1A}$, $Z_{2A}$ and corresponds to a height starting from which the aircraft AC attains the current start of flare height $Z_0$ while maintaining its current descent conditions for a predetermined second duration; and
  - a computation unit 8 ("COMP3") configured for determining, in real time, the time at which the current height $Z_{AC}$ of the aircraft AC attains the first reference height $Z_{1A}$, $Z_{2A}$ during the descent and the time at which the current height $Z_{AC}$ of the aircraft AC attains the second reference height $Z_{1B}$, $Z_{2B}$ during the descent. In order to do this the computation unit 8 compares the current height of the aircraft with the reference heights; and
- at least one acoustic emission unit 9 which is connected by the intermediary of a link 10 to the central processing unit 4, and which comprises at east one loud speaker 11 for emitting sound signals (illustrated by a symbol 12 in FIG. 1) in the cockpit. The acoustic emission unit 9 is configured for emitting at least two sound signals in the cockpit of the aircraft AC, namely a first sound signal at the time (determined by the computation unit 8) at which the current height $Z_{AC}$ of the aircraft AC attains the first reference height $Z_{1A}$, $Z_{2A}$ and a second sound signal at the time (determined by the computation unit 8) at which the current height $Z_{AC}$ attains the second reference height $Z_{1B}$, $Z_{2B}$.

The device 1 thus continuously acquires (repetitively) the current flight parameters and continuously re-computes the first and second reference heights, in such a way as to be able to emit the sound signals at the correct time on the basis of continually updated data.

The acoustic emission unit 9 comprises at least one loud speaker 11 by which the sound signal is emitted in the cockpit of the aircraft AC, as illustrated by a symbol 12 in FIG. 1.

In a preferred embodiment, each of the emitted sound signals comprises at least one beep (that is to say a brief sound), and preferably two (or more) beeps.

Thanks to the emission of the sound signal in the cockpit of the aircraft AC, the device 1 makes it possible to alert the pilot so that he operates the control stick at the correct time in order to bring it into an appropriate position, without having to focus visually on instruments such as display devices or indicators in the cockpit, in order to initiate the flare maneuver at the correct time.

In a preferred embodiment, the computation unit 6 is configured for computing the current start of flare height $Z_0(t)$, t being time, on the basis of the following expression (or equation):

$$Z_0(t) = \tau_{ref}(V_{Z_0}(t) - V_{Z_i})$$

where:
$V_{Z_0}(t)$ is the current true vertical speed of the aircraft AC along the flight trajectory TV (FIGS. 2 and 3) following a descent plan of the "glide" type;
$V_{Z_i}$ is a predetermined value of true vertical speed on impact (or on touchdown) on the ground, that is to say the desired vertical speed of the aircraft at the time of the impact; and
$\tau_{ref}$ is a reference constant.

The computation of the start of flare height $Z_0$ is based on the hypothesis of an exponential trajectory, supported by the hypothesis that the slope is proportional to the height.

The vertical speed $V_{Z_i}$ (on impact) is, either acquired automatically by the device 1 from an onboard system forming part of the acquisition unit 3, or entered manually by the pilot by a usual input device (touch screen, trackball, keyboard, etc.) forming part of the acquisition unit 3. It is for example 2.5 feet per second (about 0.76 meters per second).

Figure 2:
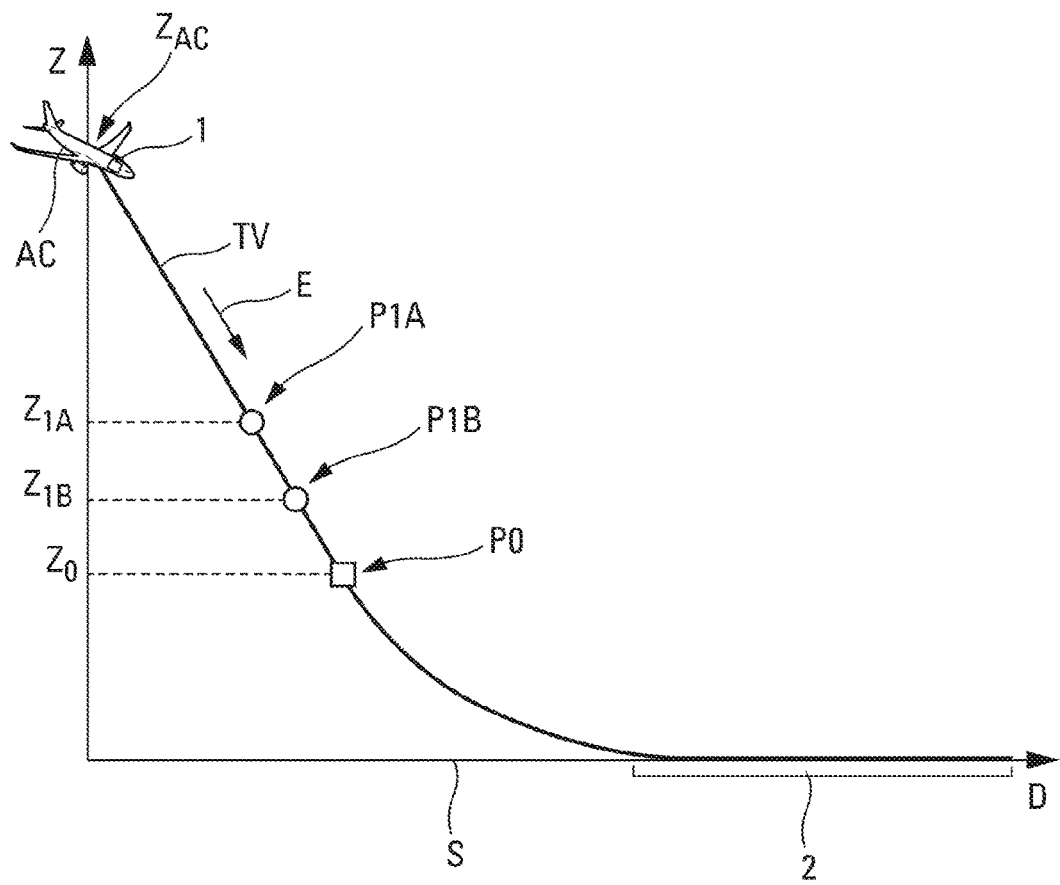
FIG. 2 is a graph illustrating principal positions for the implementation of the disclosure herein along a descent trajectory of an aircraft, in a first embodiment.
Figure 3:
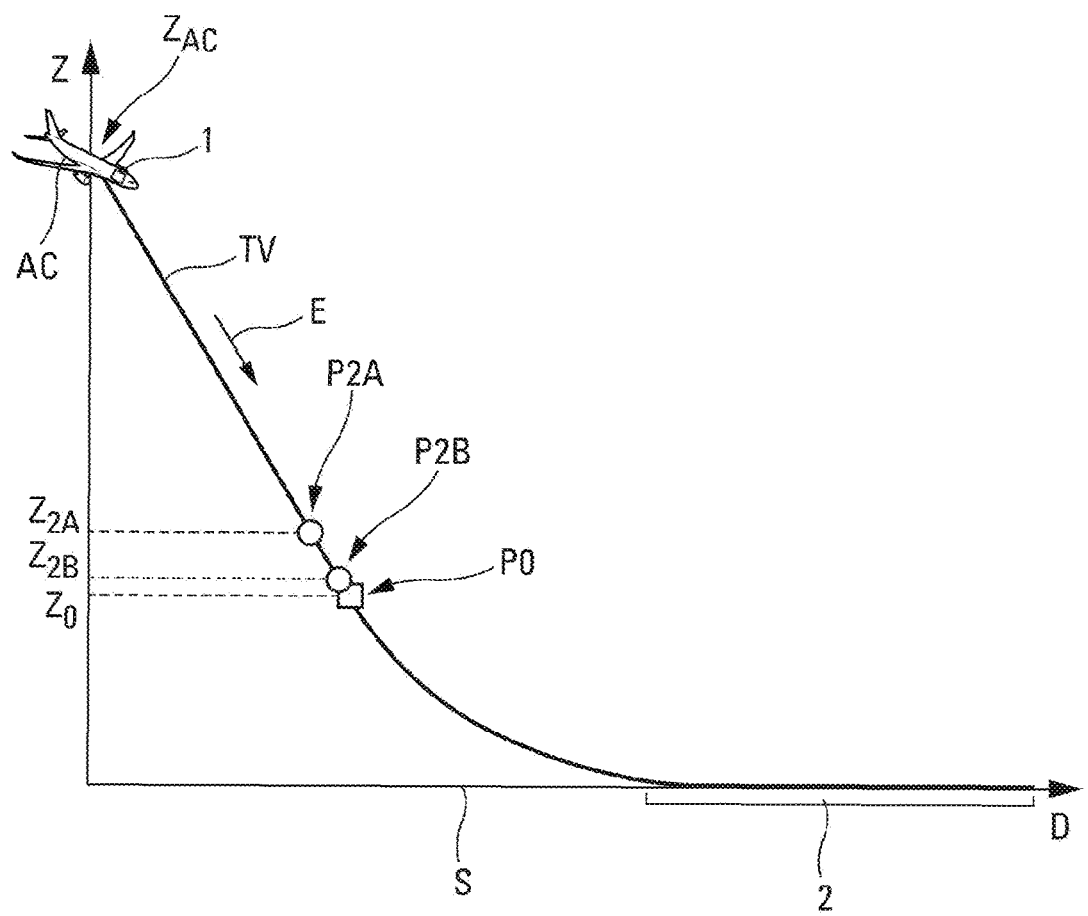
FIG. 3 is a graph illustrating principal positions for the implementation of the disclosure herein along a descent trajectory of an aircraft, in a second embodiment.

FIGS. 2 and 3 are graphs representing a height Z (with respect to the ground S) as a function of the horizontal distance D from the current position $Z_{AC}$ of the aircraft AC.

Moreover, the computation unit 6 (or a computation element of the acquisition unit 3) computes the current true vertical speed $V_{Z_0}(t)$ by the following expression:

$$V_{Z_0}(t) = V_{TAS}(t) \sin \gamma(t)$$

where:
$V_{TAS}(t)$ is the current true speed of the aircraft with respect to the ground, which is determined by usual onboard means forming part of the acquisition unit 3;
$\gamma(t)$ is the current slope of the "glide" descent plan.
Moreover, the reference constant $\tau_{ref}$ satisfies the following equation:

$$\tau_{ref} = \left( \frac{Z_{0ref}}{V_{Z_{0ref}} - V_{Z_i}} \right)$$

where:
$Z_{0ref}$ is a reference flare height; and
$V_{Z_{0ref}}$ is a reference vertical speed.

In a preferred embodiment, the computation unit 7 is configured for computing the reference heights ZA (namely $Z_{1A}$ or $Z_{2A}$) and ZB (namely $Z_{1B}$ or $Z_{2B}$), from the following expressions respectively:

$$Z1(t) = V_{Z_0}(t) * DA + Z_0(t)$$

$$Z2(t) = V_{Z_0}(t) * DB + Z_0(t)$$

where, in addition to the aforethe data:
DA (namely D1A or D2A) is the first duration; and
DB (namely D1B or D2B) is the second duration.

In a first embodiment, the acoustic emission unit 9 is configured for emitting an anticipation message for helping a pilot of the aircraft AC to anticipate the flare. In this first embodiment, the first sound signal is a warning signal which is emitted when the aircraft AC attains, during the descent, a position P1A on the flight trajectory TV at a height $Z_{1A}$, as shown in FIG. 2. This warning signal warns the pilot of the imminence of the initiation. The second sound signal is an initiation of the flare signal, which is emitted when the aircraft AC attains a position P1B on the flight trajectory TV at a height $Z_{1B}$. This initiation signal therefore indicates to the pilot that he should operate the control stick.

In this case, preferably:
the first duration D1A (between the position P1A and the position P0 on the trajectory TV at the height $Z_0$) is between 2 and 2.5 seconds; and
the second duration D1B (between the positions P1B and P0) is between 1 and 1.5 seconds.

Moreover, in a second embodiment, the acoustic emission unit 9 is configured for emitting an initiation message to help a pilot of the aircraft AC to initiate the flare maneuver. In this second embodiment, the first sound signal is signal of initiation of the flare which is emitted when the aircraft AC attains, during the descent, a position P2A on the flight trajectory TV at a height $Z_{2A}$, as shown in FIG. 3. This initiation signal therefore requests the pilot to operate the control stick. With regard to the second sound signal, this is a reminder signal which is emitted when the aircraft AC attains a position P2B on the flight trajectory TV at a height $Z_{2B}$.

In this case, preferably:
the first duration D2A (between the positions P2A and P0) is between 1 and 1.5 seconds; and
the second duration D2B (between the positions P2B and P0) is between 0.1 and 0.2 seconds.

The difference between the durations D2A and D2B can notably take into account the estimated reaction time of the pilot.

Figure 4:
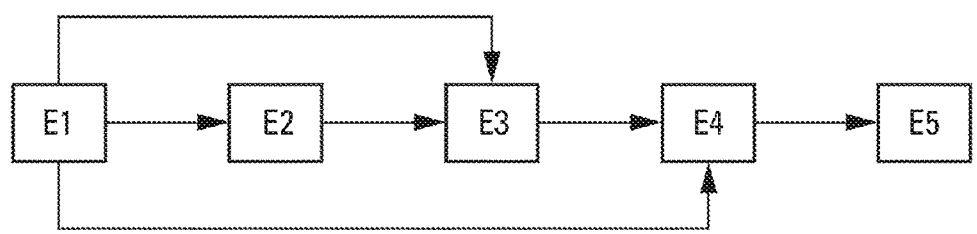
FIG. 4 is the block diagram of a method for assisting the initiation of a flare maneuver.

The operation of the device 1 implementing a method for assisting the initiation is described hereafter. This method for assisting the initiation comprises a series of steps, shown in FIG. 4 and used repetitively during a descent of the aircraft AC along the flight trajectory TV followed (in the direction indicated by an arrow E in FIGS. 2 and 3), for the purpose of a landing on the runway 2:
an acquisition step E1, implemented by the acquisition unit 3 (FIG. 1), consisting of or comprising acquiring in real time current values of flight parameters of the aircraft AC, including the current height $Z_{AC}$ of the aircraft AC with respect to the ground S;

a computation step E2, implemented by the computation unit 6, consisting of or comprising computing, in real time, a current start of flare height $Z_0$, on the basis of current values acquired in the acquisition step E1;

a computation step E3, implemented by the computation unit 7, consisting of or comprising computing, in real time, on the basis of data acquired in step E1, at least a first height and a second height called reference heights, the first reference height $Z_{1A}$, $Z_{2A}$ corresponding to height starting from which the aircraft AC attains the current start of flare height $Z_0$ while maintaining its current descent conditions (namely its current vertical speed and its current slope notably) over a first predetermined duration, and the second reference height $Z_{1B}$, $Z_{2B}$ corresponding to the height starting from which the aircraft AC attains the current start of flare height $Z_0$ while maintaining its current descent conditions over a second predetermined duration;

a third computation step E4, implemented by the computation unit 8, consisting of or comprising determining, in real time, the time at which the current height $Z_{Ac}$ of the aircraft AC, acquired in step E1, attains during the descent the first reference height $Z_{1A}$, $Z_{2A}$ determined in the computation step E3, as well as the time at which the current height $Z_{AC}$ of the aircraft AC attains the second reference height $Z_{1B}$, $Z_{2B}$ determined in the computation step E3; and an acoustic emission step E5, implemented by the acoustic emission unit 9, consisting of or comprising emitting at least two sound signals 12 in the cockpit of the aircraft AC, namely a first sound signal 12 when the current height $Z_{AC}$ of the aircraft AC attains the first reference height $Z_{1A}$, $Z_{2A}$ during the descent and a second sound signal 12 when the current height $Z_{AC}$ of the aircraft AC attains the second reference height $Z_{1B}$, $Z_{2B}$ during the descent.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting initiation of a flare maneuver of an aircraft during a landing of the aircraft, the method being implemented during a descent of the aircraft during the landing and comprising:

acquiring in real time, by at least one acquisition unit, current values of flight parameters of the aircraft, including a current height of the aircraft with respect to the ground;

computing in real time, by a first computation unit, a current start of flare height based on the current values acquired;

computing in real time, by the computation unit, reference heights, which comprise at least a first height and a second height, wherein the first reference height corresponds to a height starting from which the aircraft attains the current start of flare height while maintaining its current descent conditions over a first predetermined duration, and wherein the second reference height is less than the first reference height and corresponds to a height starting from which the aircraft attains the current start of flare height while maintaining its current descent conditions over a second predetermined duration;

determining in real time, by a third computation unit, a time at which the current height of the aircraft attains the first reference height during the descent and a time at which the current height of the aircraft attains the second reference height during the descent; and emitting, by an acoustic emission unit, at least two sound signals in a cockpit of the aircraft, wherein the at least two sound signals comprise a first sound signal, which is emitted when the current height of the aircraft attains the first reference height during the descent, and a second sound signal, which is emitted when the current height of the aircraft attains the second reference height during the descent.

2. The method of claim 1, wherein the current start of flare height $Z_0(t)$ is computed as a function of time t, from a following expression:

$$Z_0(t) = \tau_{ref}(V_{Z_0}(t) - V_{Z_i}),$$

wherein:

$V_{Z_0}(t)$ is current vertical speed of the aircraft on a trajectory of the descent;

$V_{Z_i}$ is a predetermined value of vertical speed on touchdown of the aircraft on the ground; and $\tau_{ref}$ is a reference constant.

3. The method of claim 1, wherein each of the at least two sound signals comprises at least one beep.

4. The method of claim 1, wherein emitting the at least two sound signals comprises emitting an anticipation message to help a pilot of the aircraft to anticipate the flare, wherein the first sound signal is a warning signal and the second sound signal is an initiation of the flare signal.

5. The method of claim 4, wherein:

the first predetermined duration is between 2 and 2.5 seconds; and the second predetermined duration is between 1 and 1.5 seconds.

6. The method of claim 1, wherein emitting the at least two sound signals comprises emitting an initiation message to help a pilot of the aircraft to initiate the flare, wherein the first sound signal is a signal of initiation of the flare and the second sound signal is a reminder signal.

7. The method of claim 6, wherein:
the first predetermined duration is between 1 and 1.5 seconds; and
the second predetermined duration is between 0.1 and 0.2 seconds.

8. A device for assisting initiation of a flare maneuver of an aircraft during a landing of the aircraft, the device comprising:
at least one acquisition unit configured for acquiring, in real time, current values of flight parameters of the aircraft, including a current height of the aircraft with respect to the ground;
a first computation unit configured for computing, in real time, a current start of flare height, based on the current values acquired;
a second computation unit configured for computing, in real time, reference heights, which comprise at least a first height and a second height, wherein the first reference height corresponds to a height starting from which the aircraft attains the current start of flare height while maintaining its current descent conditions over a predetermined first duration, and wherein the second reference height is less than the first reference height and corresponds to a height starting from which the aircraft attains the current start of flare height while maintaining its current descent conditions over a predetermined second duration;
a third computation unit configured for determining, in real time, a time at which the current height of the aircraft attains the first reference height during the descent and a time at which the current height of the aircraft attains the second reference height during the descent; and
at least one acoustic emission unit configured for emitting at least two sound signals in a cockpit of the aircraft, wherein the at least two sound signals comprise a first sound signal, which is emitted when the current height of the aircraft attains the first reference height during the descent, and a second sound signal, which is emitted when the current height of the aircraft attains the second reference height during the descent.

9. The device of claim 8, wherein the first computation unit is configured for computing the current start of flare height $Z_0(t)$ as a function of time t, from a following expression:

$$Z_0(t) = \tau_{ref}(V_{Z_0}(t) - V_{Z_i}),$$

wherein:
$V_{Z_0}(t)$ is current vertical speed of the aircraft on a trajectory of the descent;
$V_{Z_i}$ is a predetermined value of vertical speed on touchdown of the aircraft on the ground; and
$\tau_{ref}$ is a reference constant.

10. The device of claim 8, wherein each of the at least two sound signals comprises at least one beep.

11. The device of claim 8, wherein the at least one acoustic emission unit is configured to emit an anticipation message to help a pilot of the aircraft to anticipate the flare, wherein the first sound signal is a warning signal, and wherein the second sound signal is an initiation of the flare signal.

12. The device of claim 11, wherein:
the first duration is between 2 and 2.5 seconds; and
the second duration is between 1 and 1.5 seconds.

13. The device of claim 8, wherein the at least two sound signals comprises an initiation message to help a pilot of the aircraft to initiate the flare, wherein the first sound signal is a signal of initiation of the flare and the second sound signal is a reminder signal.

14. The device of claim 13, wherein:
the first duration is between 1 and 1.5 seconds; and
the second duration is between 0.1 and 0.2 seconds.

* * * * *